United States Patent
Holmberg et al.

(10) Patent No.: US 7,937,818 B2
(45) Date of Patent: May 10, 2011

(54) SPLIT CABLE SEAL

(75) Inventors: Matthew Holmberg, Le Center, MN (US); James J. Solheid, Lakeville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 633 days.

(21) Appl. No.: 11/840,003

(22) Filed: Aug. 16, 2007

(65) Prior Publication Data

US 2007/0278005 A1 Dec. 6, 2007

Related U.S. Application Data

(63) Continuation of application No. 11/546,022, filed on Oct. 11, 2006, now Pat. No. 7,273,985, which is a continuation of application No. 11/098,031, filed on Apr. 1, 2005, now Pat. No. 7,132,605.

(51) Int. Cl.
*B23P 11/02* (2008.01)

(52) U.S. Cl. ........... 29/450; 29/451; 29/452; 29/855; 29/857; 174/50; 174/60; 174/68.1; 174/68.3; 174/64; 174/654; 174/655; 220/4.02; 220/3.2; 220/3.8

(58) Field of Classification Search ............ 174/50, 174/55, 58, 59, 60, 68.1, 68.3, 135, 138 R, 174/64, 17 R, 650, 653–655, 657, 663, 664, 174/669; 220/4.02, 3.2, 3.8; 29/450, 451, 29/452, 428, 605, 855, 856, 857
See application file for complete search history.

(56) References Cited

U.S. PATENT DOCUMENTS

| | | | |
|---|---|---|---|
| 3,946,467 | A | 3/1976 | Lukas et al. |
| 4,140,366 | A | 2/1979 | Makuch et al. |
| 4,208,092 | A | 6/1980 | Monaghan et al. |
| 4,354,731 | A | 10/1982 | Mouisie |
| 4,447,120 | A | 5/1984 | Borsuk |
| 4,534,617 | A | 8/1985 | Kloots |
| 4,674,833 | A | 6/1987 | Des Forges |
| 4,679,895 | A | 7/1987 | Huber |
| 4,684,210 | A | 8/1987 | Matsunaga et al. |

(Continued)

FOREIGN PATENT DOCUMENTS

FR 2291510 A 7/1976

(Continued)

OTHER PUBLICATIONS

Tyco Electronics Corporation, Bushing Sleeves—Installation Accessories for Duct Sealing Devices, 2001, pp. 1-2.

(Continued)

*Primary Examiner* — David P Bryant
*Assistant Examiner* — Bayan Salone
(74) *Attorney, Agent, or Firm* — Merchant & Gould P.C.

(57) ABSTRACT

A method for sealing a cable in an enclosure includes assembling a first portion and a second portion of a cable seal around a cable. The first and second portions of the cable seal define a central axial opening having a sealing surface. The cable is disposed in the central axial opening. The method further includes inserting the cable seal and cable through an entrance of a generally u-shaped cable entry point of a side of an enclosure and positioning the cable seal within the cable entry point such that the cable seal protrudes from opposite surfaces of the side. An outer gasket seals between the surfaces of the side of the enclosure and the cable seal.

6 Claims, 17 Drawing Sheets

U.S. PATENT DOCUMENTS

| | | |
|---|---|---|
| 4,687,294 A | 8/1987 | Angeles |
| 4,696,537 A | 9/1987 | Bauer et al. |
| 4,711,520 A | 12/1987 | Bernardini |
| 4,733,934 A | 3/1988 | Wais et al. |
| 4,741,593 A | 5/1988 | Fochler |
| 4,743,088 A | 5/1988 | Balyasny |
| 4,793,684 A | 12/1988 | Oppenlander |
| 4,804,244 A | 2/1989 | Hasegawa |
| 4,805,979 A * | 2/1989 | Bossard et al. ............... 385/135 |
| 4,806,705 A | 2/1989 | Chen |
| 4,842,364 A * | 6/1989 | Chen ........................... 385/136 |
| 4,968,197 A | 11/1990 | Chen |
| 5,035,265 A | 7/1991 | Chen |
| 5,044,403 A | 9/1991 | Chen |
| 5,283,853 A | 2/1994 | Szegda |
| 5,290,073 A | 3/1994 | Chen |
| 5,315,684 A | 5/1994 | Szegda |
| 5,371,819 A | 12/1994 | Szegda |
| 5,371,821 A | 12/1994 | Szegda |
| 5,371,827 A | 12/1994 | Szegda |
| 5,444,810 A | 8/1995 | Szegda |
| 5,530,785 A | 6/1996 | Sakamoto et al. |
| 5,598,500 A | 1/1997 | Crespel et al. |
| 5,692,090 A | 11/1997 | Szegda |
| 5,832,158 A | 11/1998 | Chen |
| 6,053,639 A | 4/2000 | Chen |
| 6,274,812 B1 * | 8/2001 | Daoud .......................... 174/652 |
| 6,558,044 B1 | 5/2003 | Chen |
| 6,573,455 B1 | 6/2003 | Radelet |
| 6,739,598 B1 | 5/2004 | Saarem |
| 6,800,808 B1 | 10/2004 | Chung |
| 6,833,508 B2 | 12/2004 | Cha |
| 6,855,890 B1 | 2/2005 | Vasichek |
| 7,751,676 B2 * | 7/2010 | Riley et al. ................... 385/138 |
| 2003/0135999 A1 * | 7/2003 | Khemakhem et al. .......... 29/857 |
| 2008/0301926 A1 * | 12/2008 | Bucknell ........................ 29/452 |

FOREIGN PATENT DOCUMENTS

| | | |
|---|---|---|
| FR | 2611825 A | 9/1988 |
| GB | 2 096 348 | 10/1982 |
| JP | 55035359 A | 3/1980 |
| WO | WO 87/04573 | 7/1987 |

OTHER PUBLICATIONS

Tyco Electronics Corporation, TDUX—Inflatable Sealing System for Telephone, CATV, and Fiber Optic Cable Ducts, 2001, pp. 1-2.

Tyco Electronics Corporation, Fiber Optic Simplex Plug—Sealing Plugs for Small Diameter Ducts, 2001, pp. 1-2.

Tyco Electronics Corporation, Biplex Sealing System—Sealing Devices for Ducted Cable Networks, 2001, pp. 1-2.

Tyco Electronics Corporation, Triplex Duct Plugs—Multi-Port Sealing Devices for Ducted Cable Networks, 2001, pp. 1-2.

Tyco Electronics Corporation, Quadplex Duct Plugs—Multi-Port Sealing Devices for Ducted Cable Networks, 2001, pp. 1-2.

Tyco Electronics Corporation, Custom Duct Plugs, 2004, pp. 1-2.

Tyco Electronics Corporation, TDUX—Inflatable Sealing System for Telephone Cable Ducts for Underground Applications, 2001, pp. 1-2.

Tyco Electronics Corporation, LTEC-LTCP—Duct End Caps, 2001, pp. 1-2.

Tyco Electronics Corporation, Web Page—Tyco/Electronics—TCOM OSP—Jackmoon USA, Mar. 2005, p. 1.

Tyco Electronics Corporation, Web Page—Tyco/Electronics Telecom Outside Plant Duct Seals, Mar. 2005, pp. 1-2.

Tyco Electronics Corporation, Web Page—Tyco Electronics Telecom Outside Plant Duct Couplers, Mar. 2005, pp. 1-2.

* cited by examiner

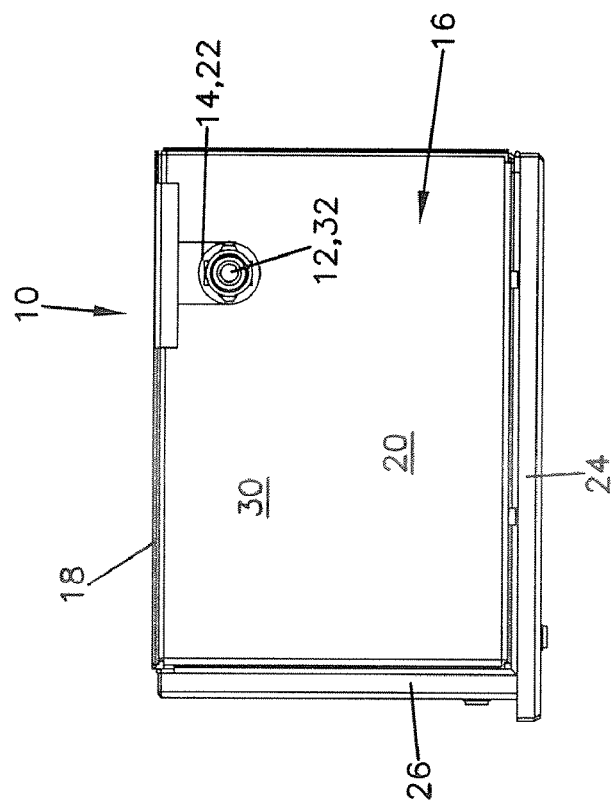
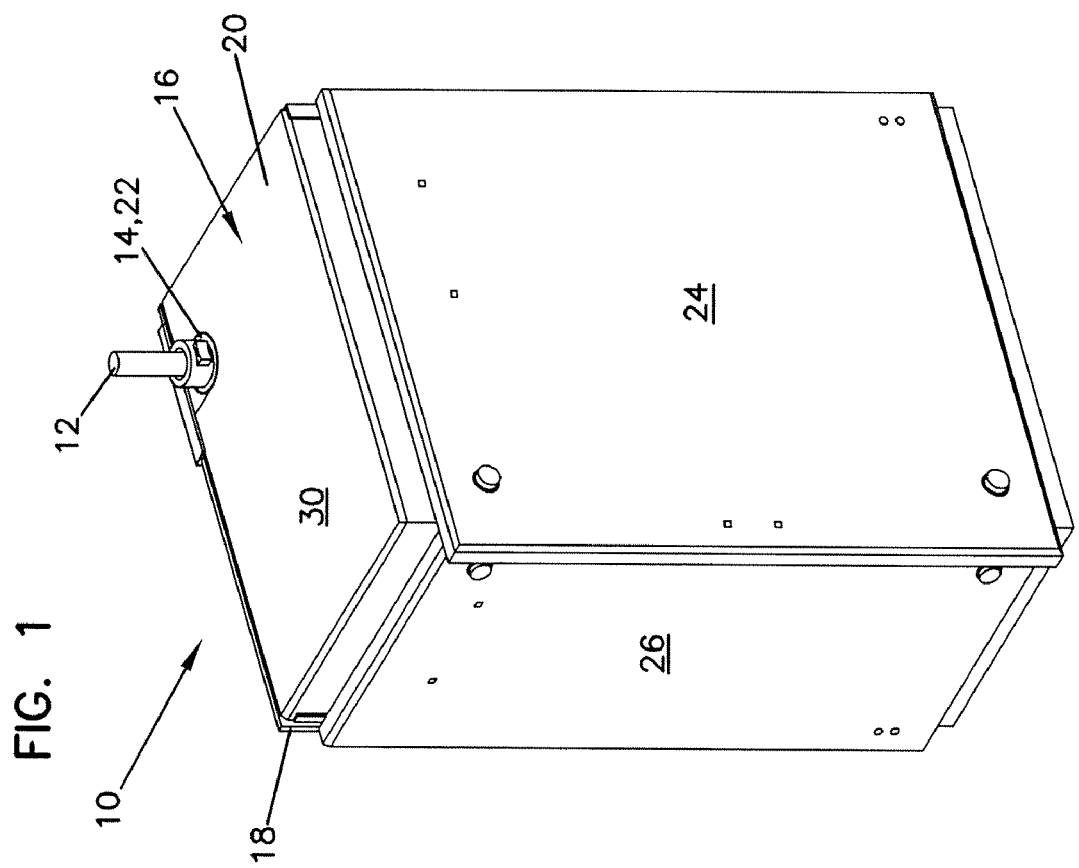

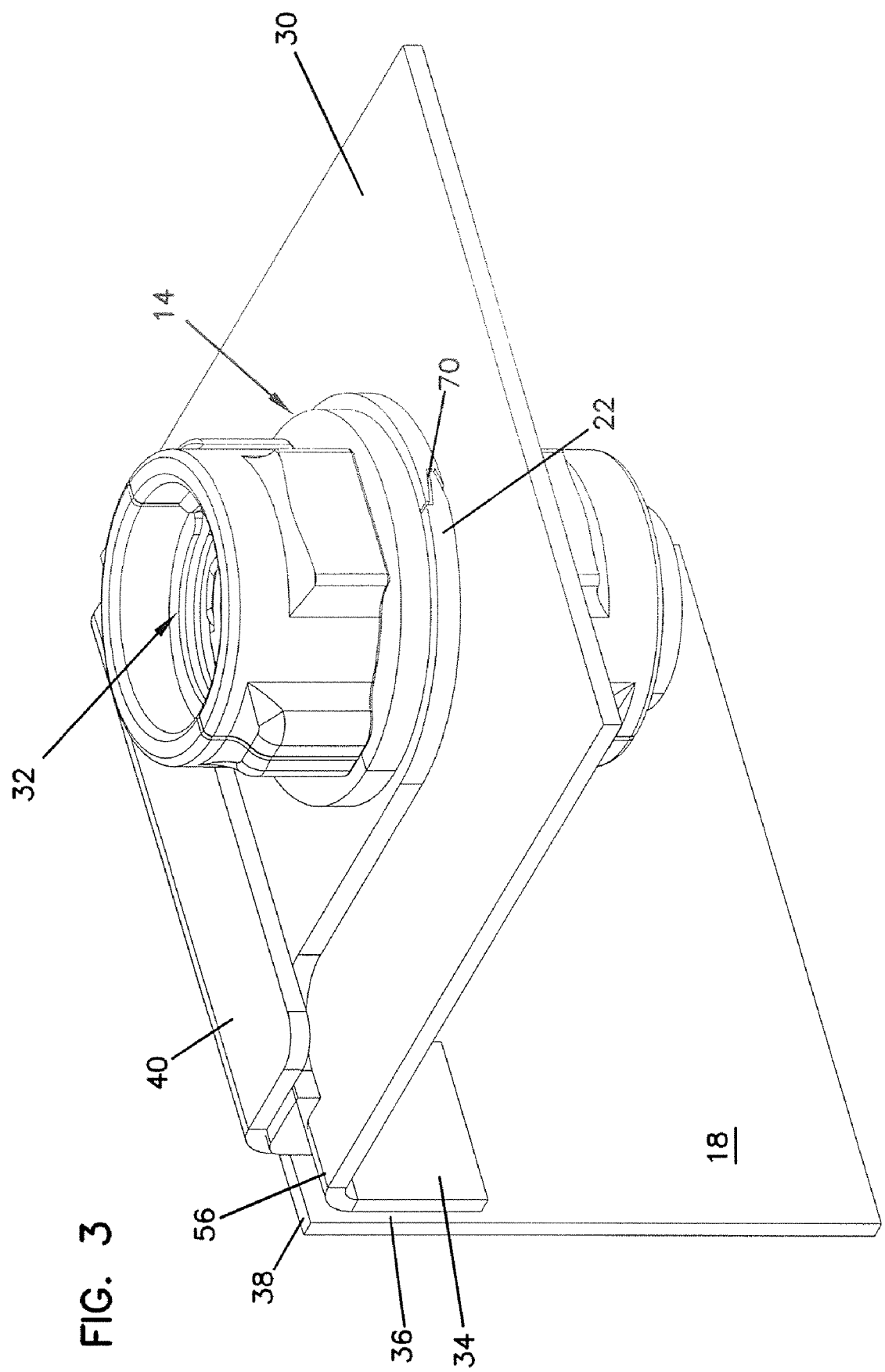

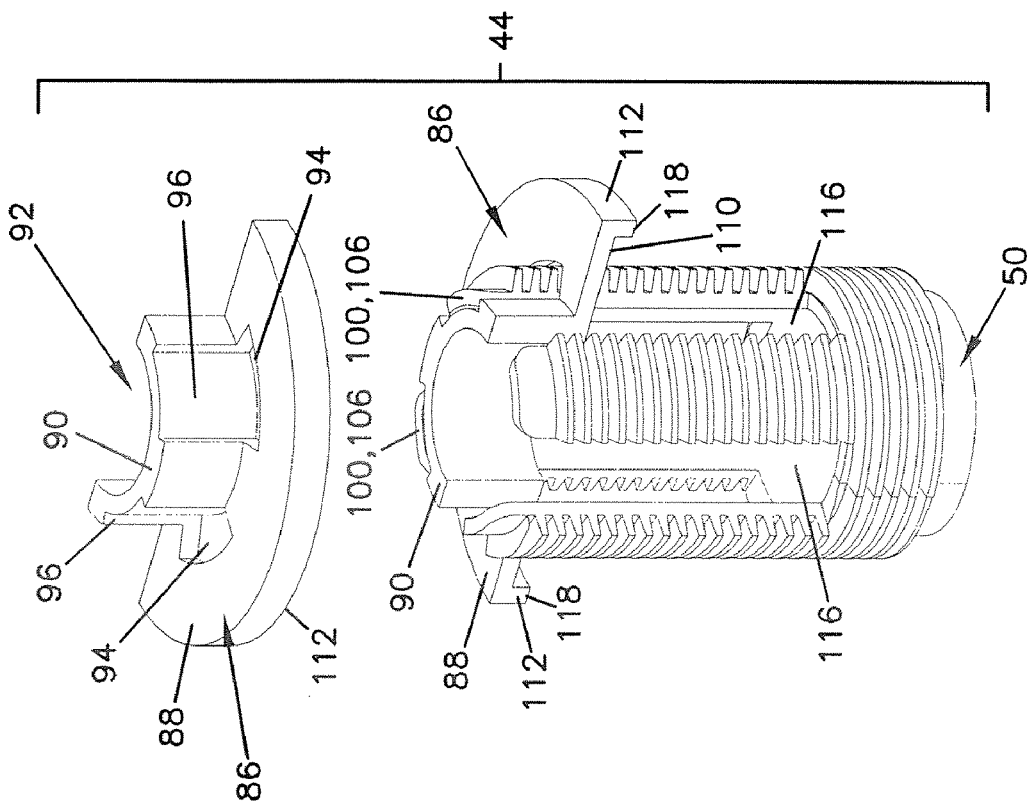
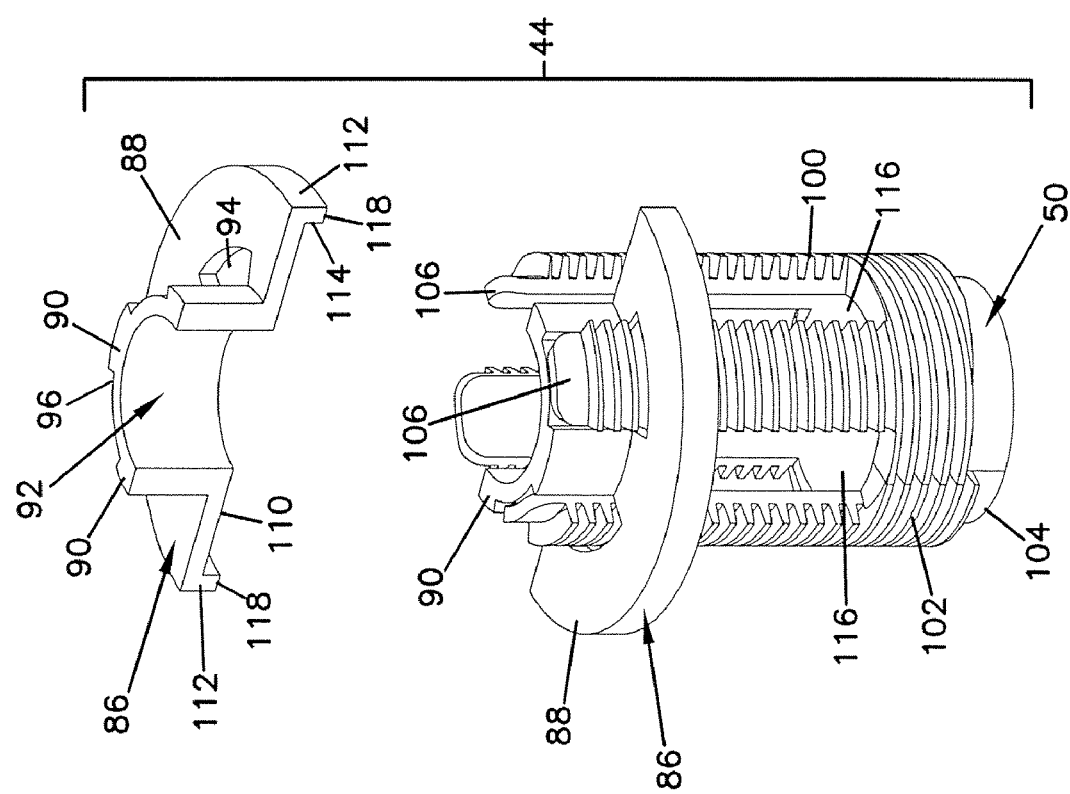

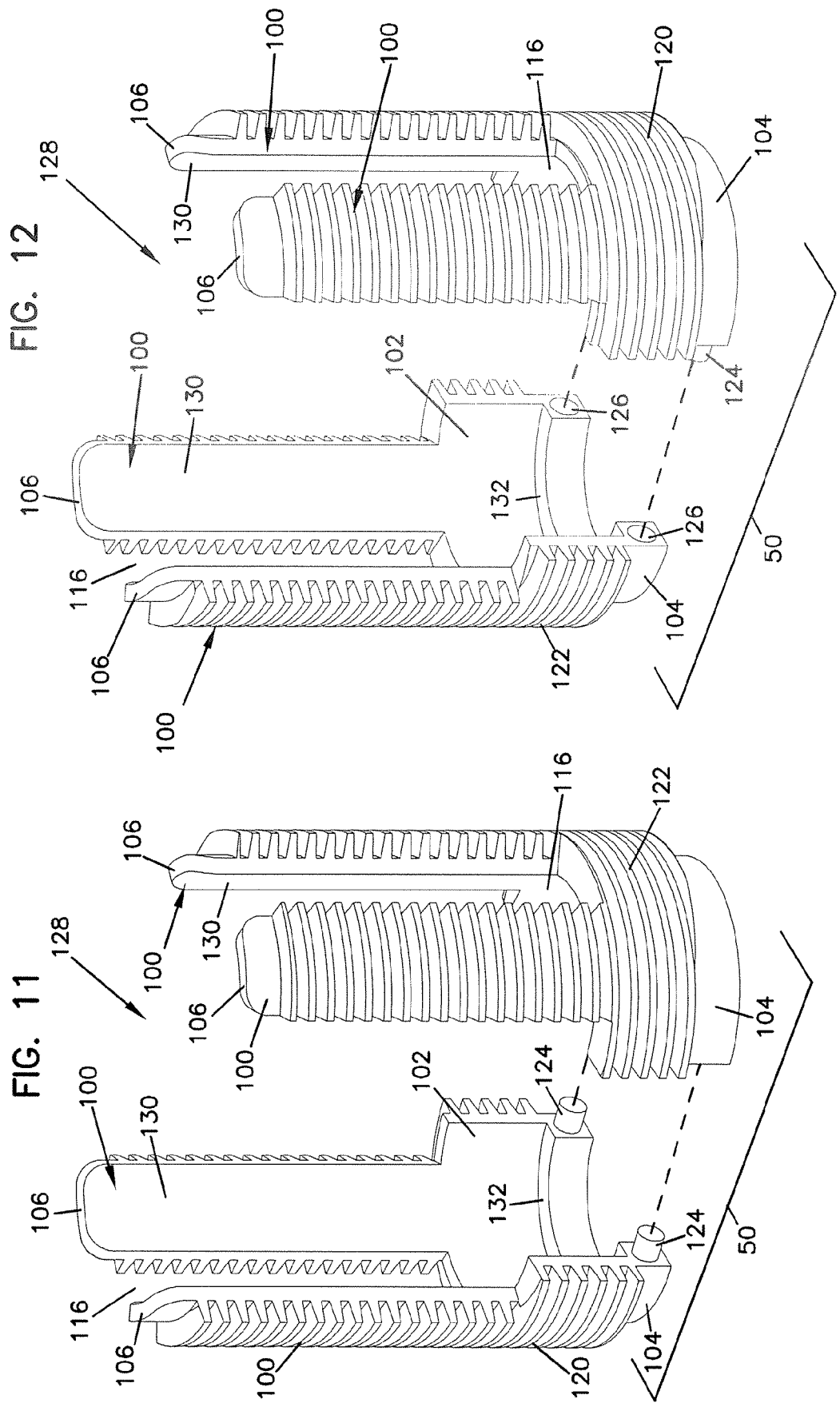

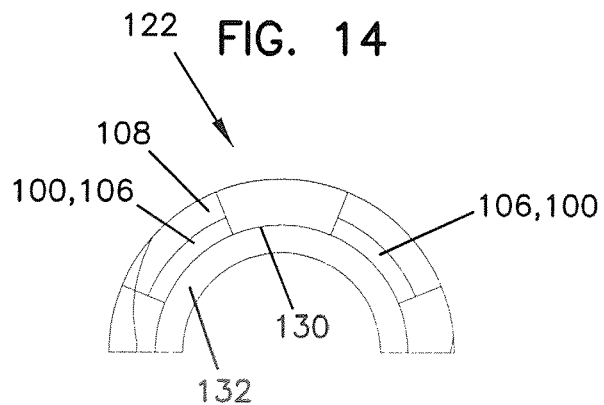
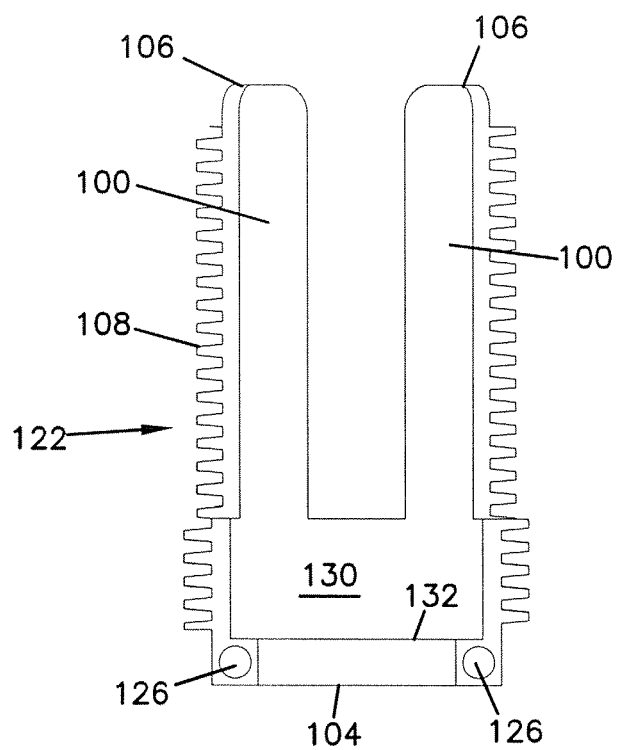
FIG. 15
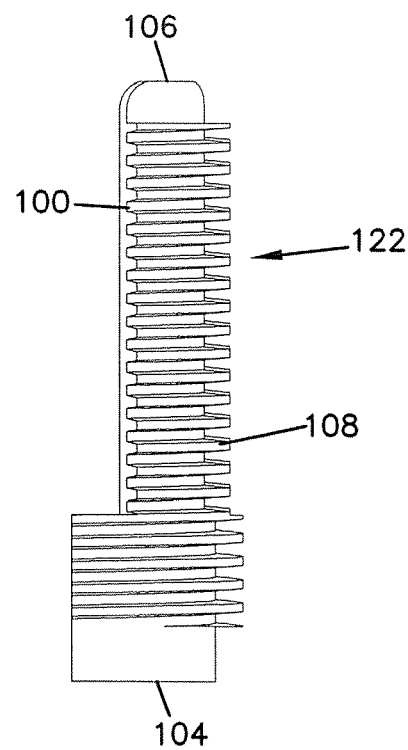
FIG. 16

FIG. 18
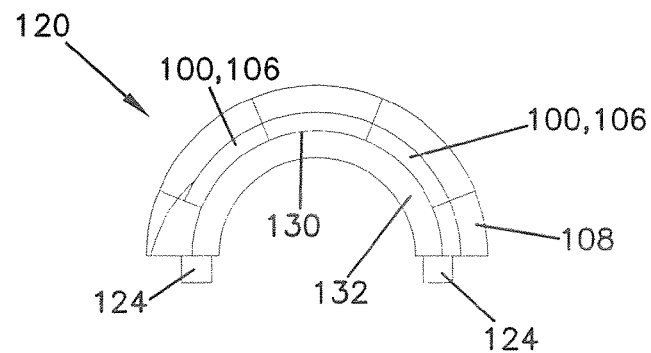
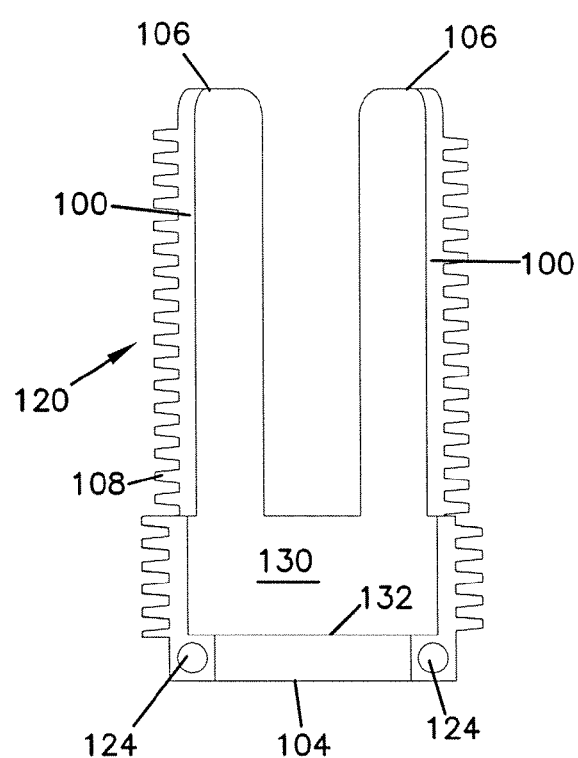
FIG. 19
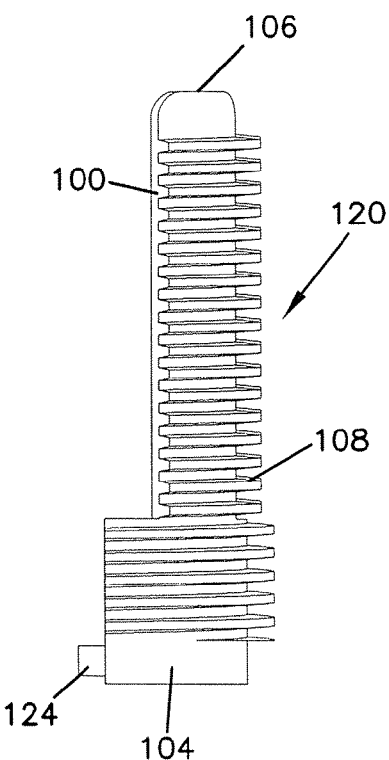
FIG. 20

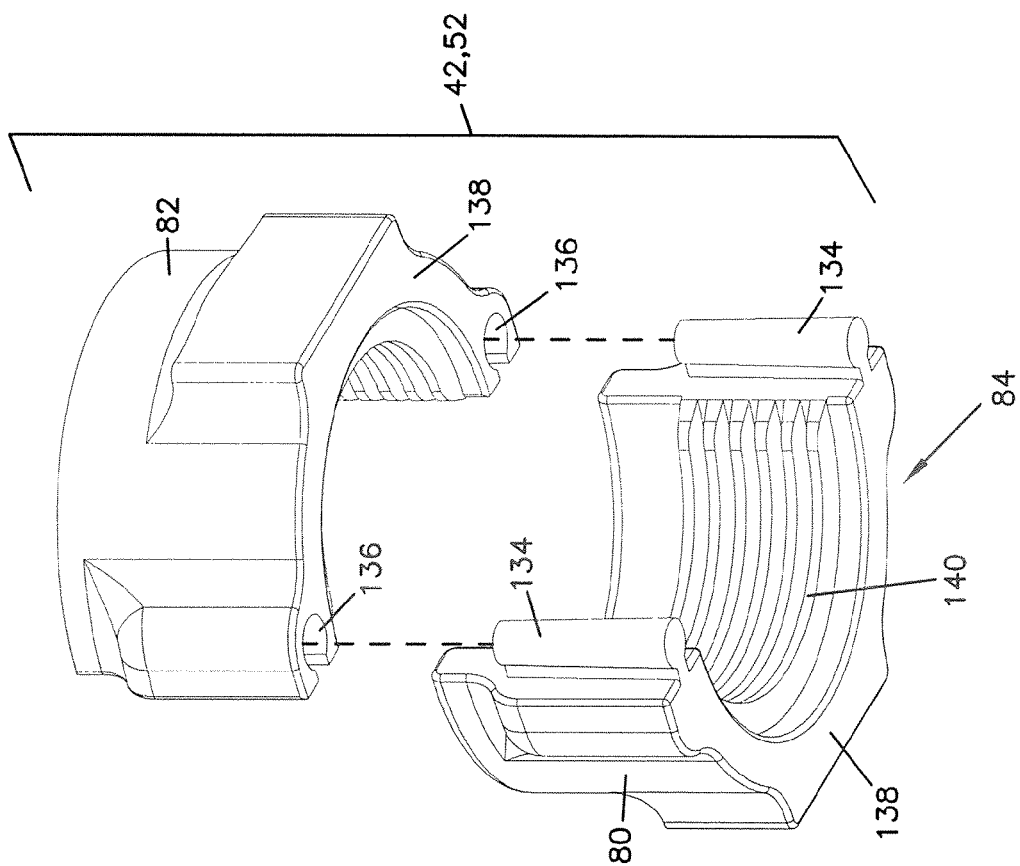
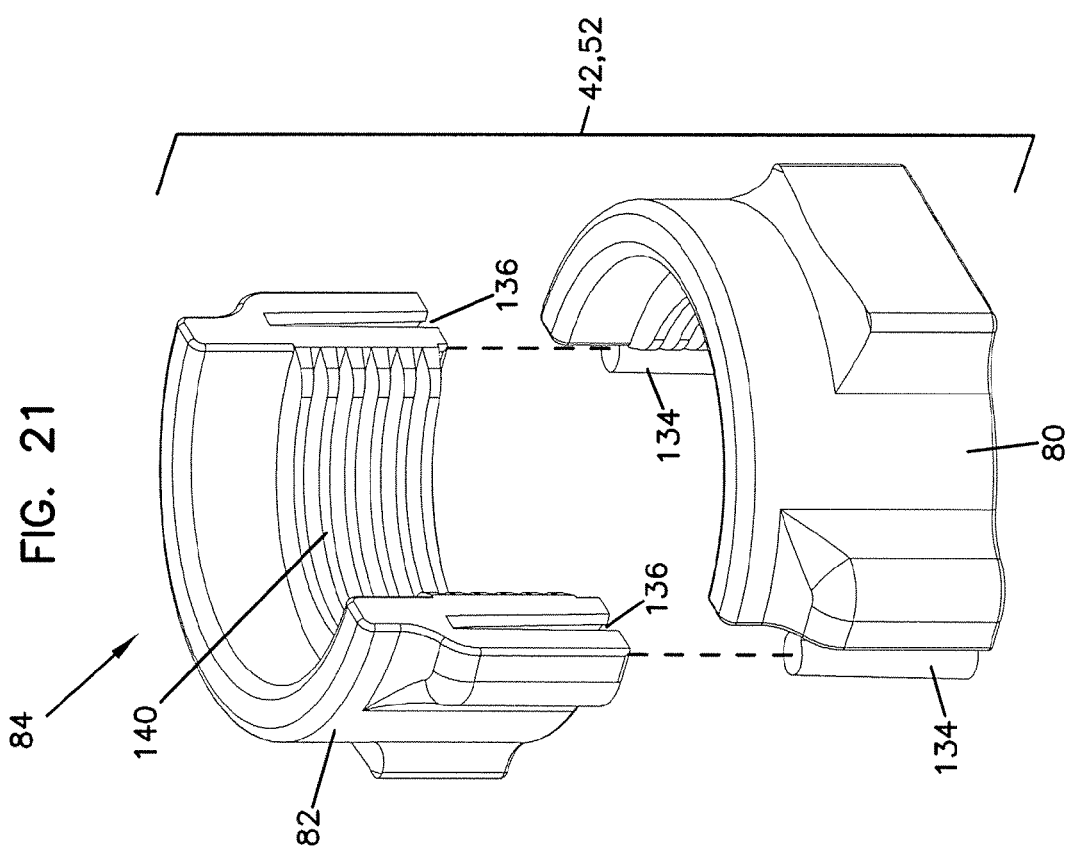

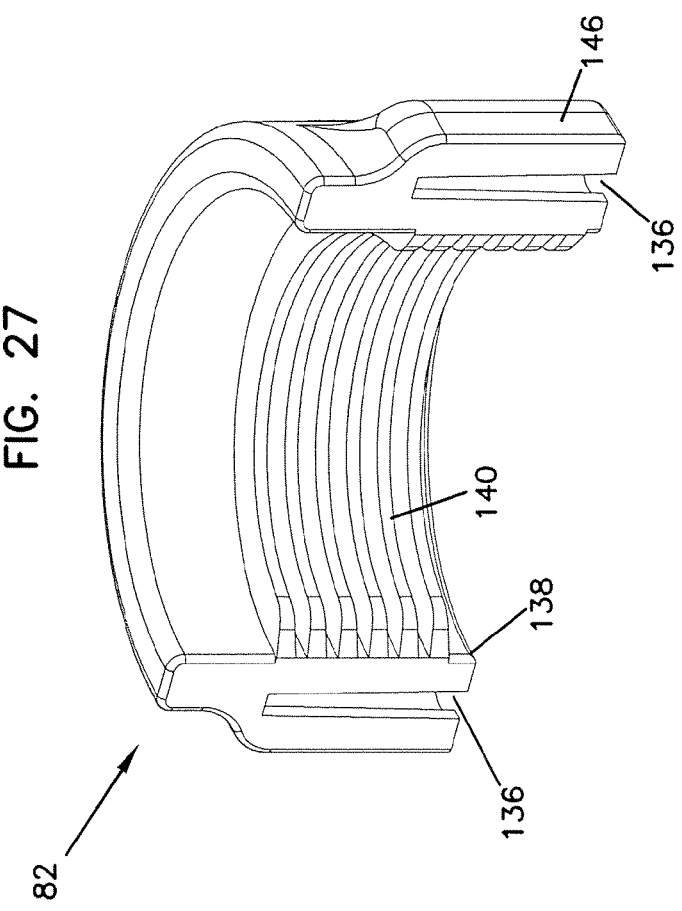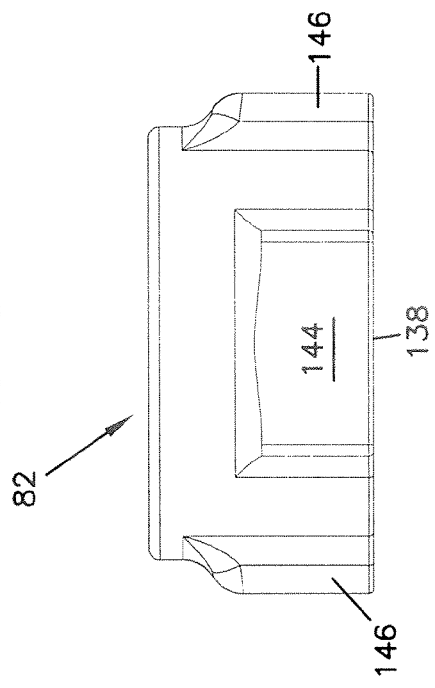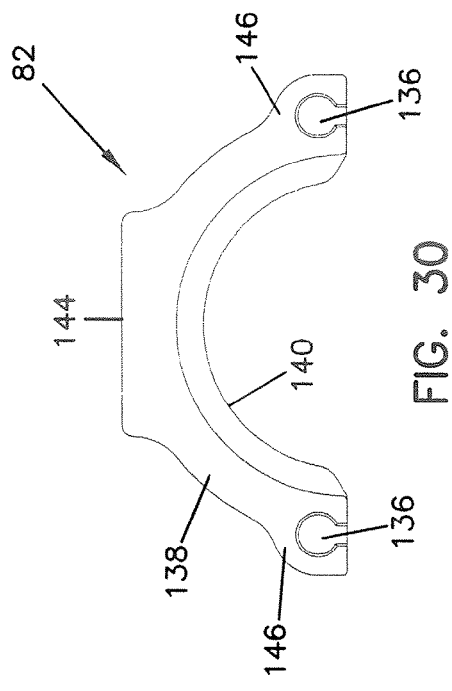

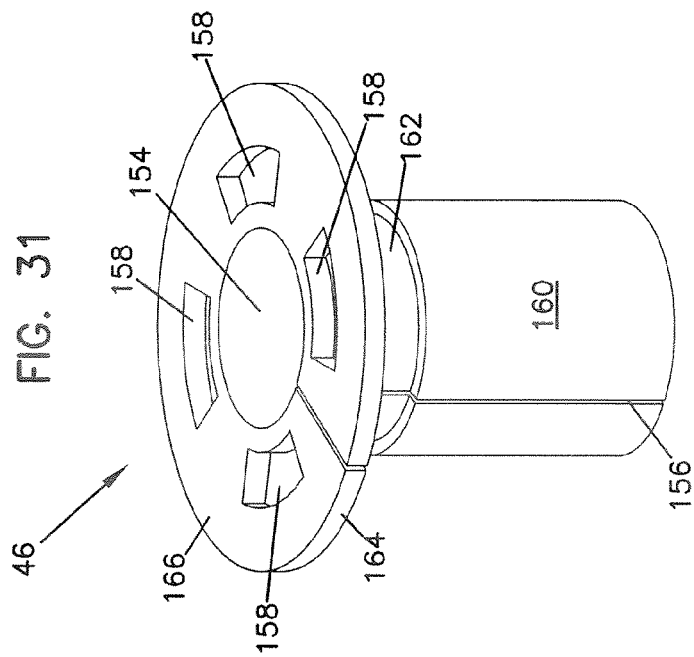
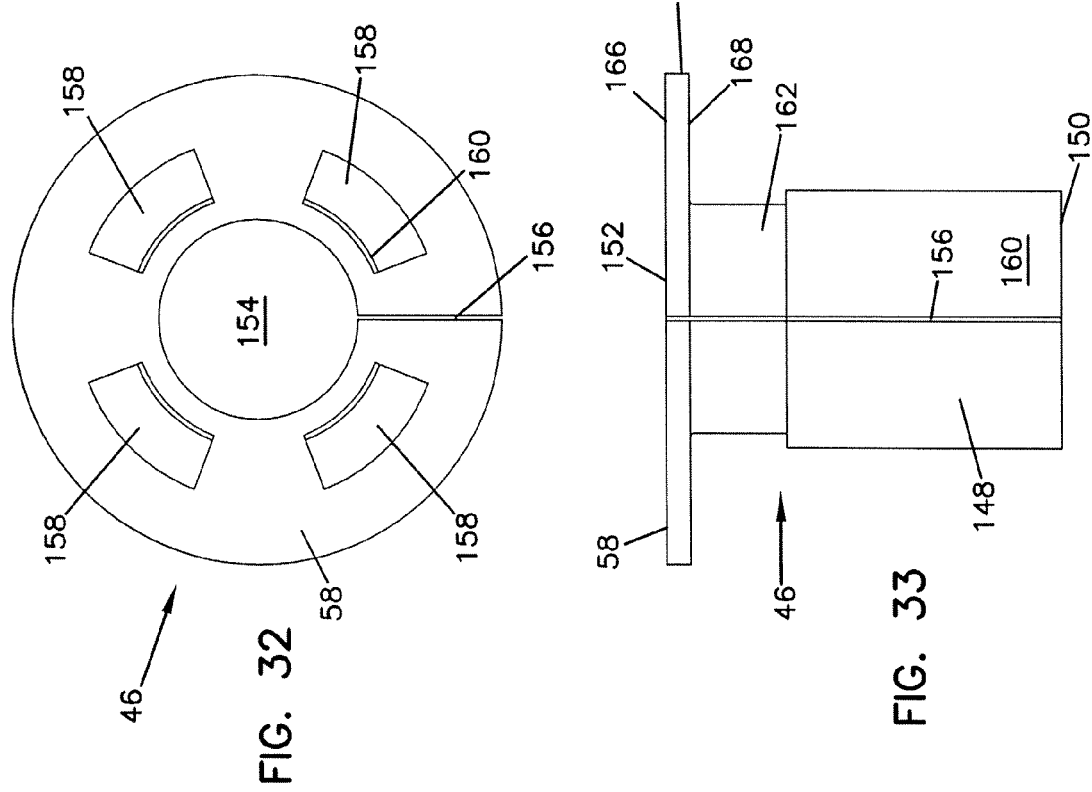

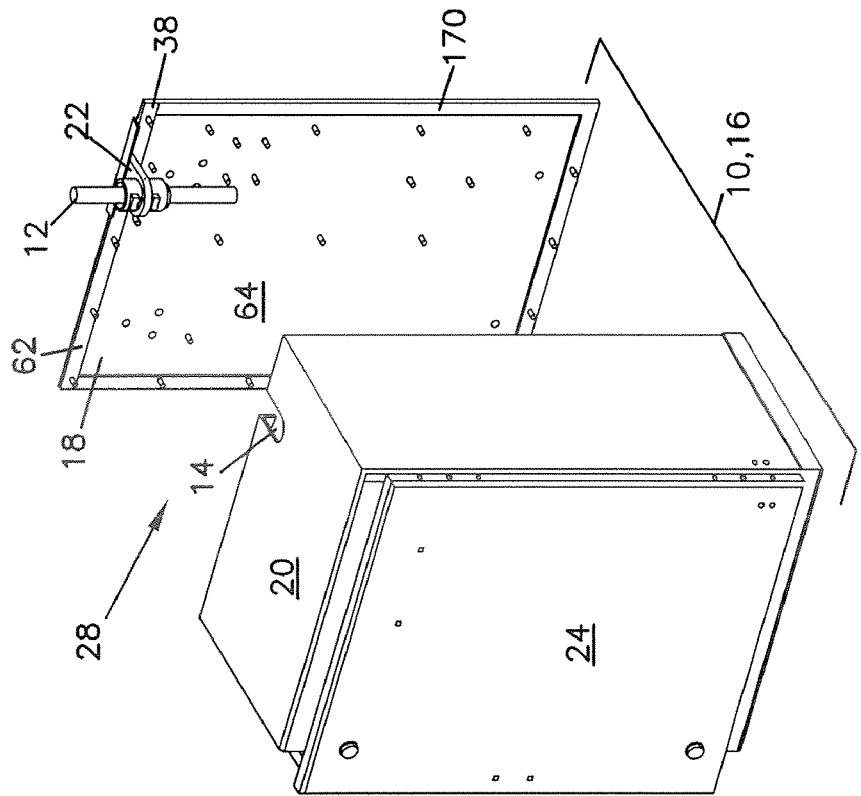
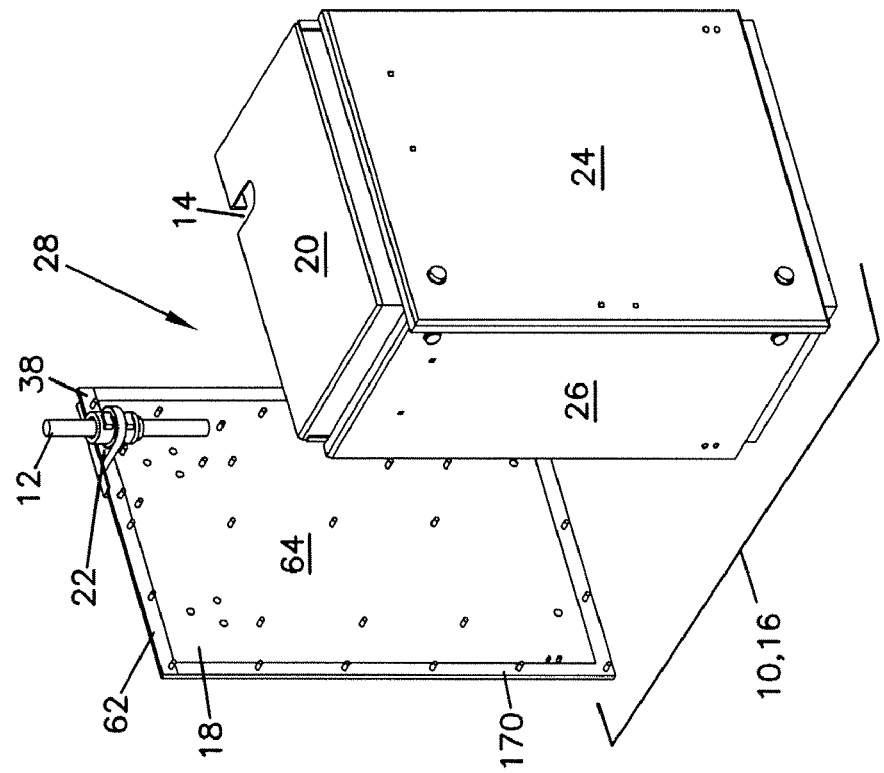

SPLIT CABLE SEAL

CROSS REFERENCE TO RELATED APPLICATION

This application is a continuation of application Ser. No. 11/546,022, filed on Oct. 11, 2006, now U.S. Pat. No. 7,273,985 which is a continuation of application Ser. No. 11/098,031, filed Apr. 1, 2005, now U.S. Pat. No. 7,132,605, which applications are incorporated herein by reference.

BACKGROUND

Telecommunications networks often include cables that extend from central installations through one or more cabinets or enclosures to reach the customer. Within these enclosures, a variety of equipment may be mounted to provide signal processing, splitting or accumulation, and also may provide cross-connections between different cables. The enclosures provide security from accidental or intentional damage for the equipment mounted within and also provide weather protection from environmental damage. Cable entering the enclosure may pass through a cable seal which ensures a weather tight seal between the cable and the housing.

Once a cabinet has been assembled with equipment and has had cable led into the interior and connected to the equipment, it may be desirable to change the housing to replace damaged elements. Such damage might be caused by an automobile accidentally impacting the enclosure or a construction accident. It may also be desirable to change an undamaged portion of a pre-assembled cabinet for another portion which is a different color, to comply with customer needs. For changes made to the cabinet for any reason, known cabinet housings and cable seals require that an end of the cable pass through the cable seal. This may require cutting and reterminating many of the cables or elements of the cables extending into the cabinet. Improvements to existing cable seals and cabinet housings are desirable.

It may still further be desirable to extend additional cables into an enclosure to expand existing service. Often, it is desirable to use pre-terminated cables to speed installation and to reduce the amount of fieldwork required. Known cable seals and housings do not permit easy entry of pre-terminated cables into existing enclosures and also provide weather tight seals between the cables and the housings. Additionally, it may be desirable to assemble a cabinet about a cable which has already been connected to equipment which will be mounted within the cabinet, rather than having to make the cable-equipment connections after mounting the equipment in the cabinet.

Improvements to these known cables seals and cabinets housings are desirable.

SUMMARY

The present invention relates to a cable seal and an enclosure including a cable seal. The cable seal provides a seal around a cable entering the enclosure and also seals against the enclosure. The enclosure can be replaced about the cable without the end of the cable passing through the cable seal. The cable seal may include one or more nuts threaded about a threaded body which are configured to compress an inner and an outer gasket to seal about the cable and to the enclosure.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 1 is a perspective view of a telecommunications enclosure with a cable entry seal according to the present invention.

FIG. 2 is a top view of the enclosure of FIG. 1.

FIG. 3 is a closer perspective view of the cable entry seal of FIG. 1, with portions of the enclosure removed for clarity.

FIG. 9 is a first partially exploded perspective view of a threaded body and split compression plate of the cable seal of FIG. 7.

FIG. 10 is a second partially exploded perspective view of a threaded body and split compression plate of the cable seal of FIG. 7.

FIG. 11 is a first exploded perspective view of the split threaded body of FIG. 9.

FIG. 12 is a second exploded perspective view of the split threaded body of FIG. 9.

FIG. 14 is a top view of the first half of the threaded body of FIG. 13.

FIG. 15 is an inner view of the first half of the threaded body of FIG. 13.

FIG. 16 is a side view of the first half of the threaded body of FIG. 13.

FIG. 18 is a top view of the second half of the threaded body of FIG. 17.

FIG. 19 is an inner view of the second half of the threaded body of FIG. 17.

FIG. 20 is a side view of the second half of the threaded body of FIG. 17.

FIG. 21 is a first perspective view of a split threaded nut of the cable seal of FIG. 7.

FIG. 22 is a second perspective view of the split threaded nut of FIG. 21.

FIG. 27 is a perspective view of a second half of the split threaded nut of FIG. 21.

FIG. 28 is a side view of the second half of the split threaded nut of FIG. 27.

FIG. 29 is an end view of the second half of the split threaded nut of FIG. 27.

FIG. 30 is a top view of the first second of the split threaded nut of FIG. 27.

FIG. 31 is a perspective view of an inner gasket of the cable seal of FIG. 4.

FIG. 32 is a top view of the inner gasket of FIG. 31.

FIG. 33 is a side view of the inner gasket of FIG. 31.

FIG. 34 is a first exploded perspective view of the telecommunications enclosure of FIG. 1.

FIG. 35 is a second exploded perspective view of the telecommunications enclosure of FIG. 1.

DETAILED DESCRIPTION OF PREFERRED EMBODIMENTS

Figure 4:
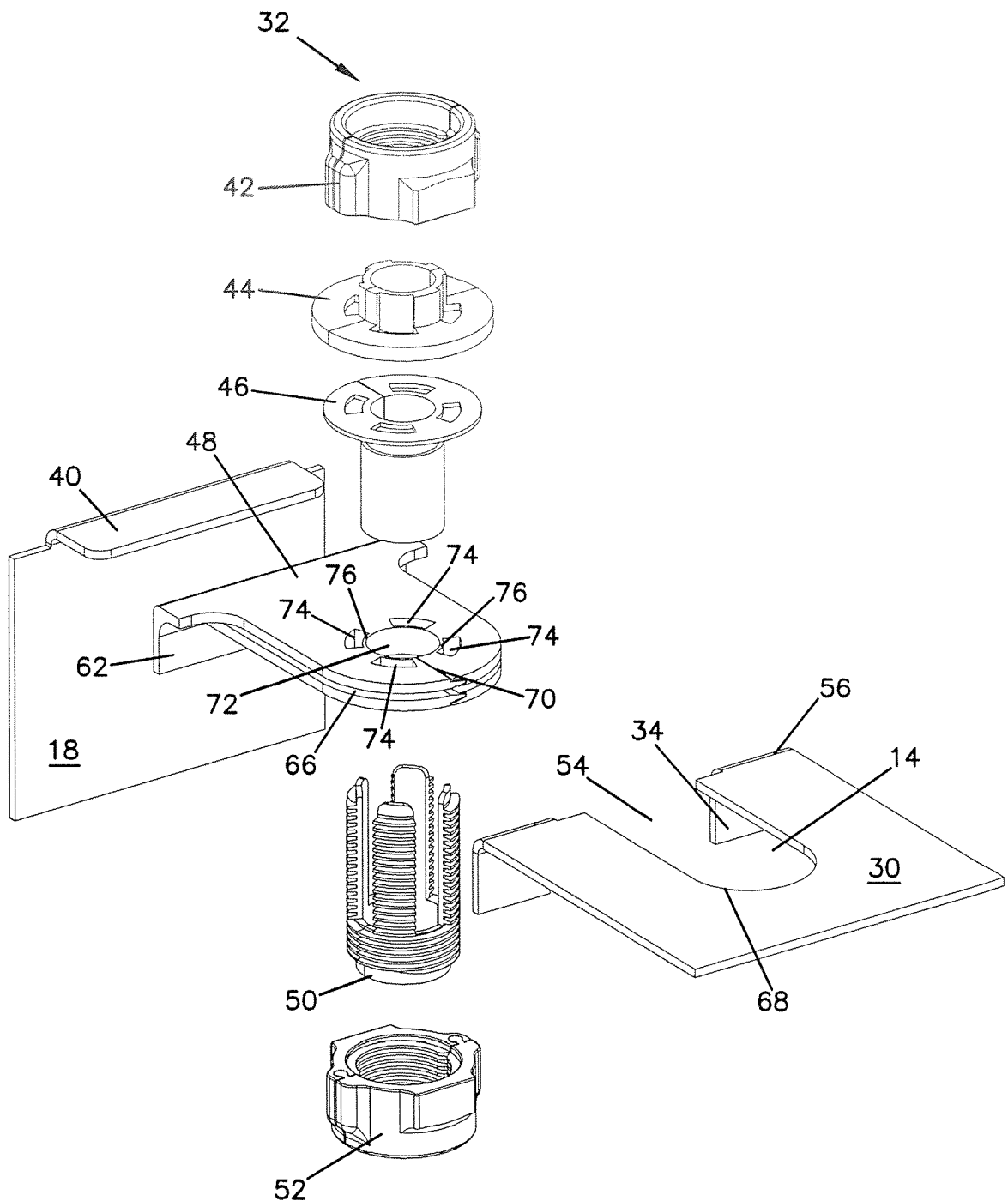
FIG. 4 is an exploded perspective view of the cable entry seal of FIG. 3.

Reference will now be made in detail to the exemplary aspects of the present invention that are illustrated in the accompanying drawings. Wherever possible, the same reference numbers will be used throughout the drawings to refer to the same or like parts.

In FIGS. 1, 2, 34 and 35, telecommunications enclosure 10 is shown with a portion of telecommunications cable 12 extending through a cable entry point 14 in a housing 16. Housing 16 includes a fixed back plate 18 and a removable front shell 20. Cable entry point 14 is formed in a top 30 of front shell 20 while a cable seal 22 fitted about cable 12 is attached to fixed plate 18. Front shell 20 may also include at least one access door, such as front door 24 and side door 26, which may provide access into an interior 28 defined within housing 16.

Referring now to FIGS. 3 and 4, cable seal 22 is shown with portions of front shell 20 and fixed plate 18 not shown and cable 12 removed. Cable seal 22 defines a central axial opening 32 permitting cable 12 to pass into interior 28. Top 30 includes a flange 34 extending along the length of fixed plate 18. Plate 18 and flange 34 are positioned with a gap 36 between for placement of a sealing material (discussed further below) to ensure a weather-tight seal between the two portions of housing 16. Along a top edge of fixed plate 18 adjacent cable entry point 14 is a generally horizontally extending flange 40. Flange 40 cooperates with cable seal 22 to ensure the integrity of the weather-tight seal between top 30 and fixed plate 18.

Referring now to FIG. 4, cable seal 22 includes an outer nut 42, a compression plate 44, an inner gasket 46, an outer gasket 48, a threaded body 50, and an inner nut 52. Cable entry point 14 is a generally u-shaped opening in top 30 with an entrance 54 for positioning cable seal 22 within the opening. Entrance 54 extends to a rear edge 56 of top 30, and flange 34 extends down from rear edge 56. Flange 40 is generally located above entrance 54 and may preferably overlap rear edge 56 on both sides of entrance 54. Preferably, gaskets 46 and 48 are made of a relatively soft and resilient material suitable for forming weather-tight seals between cable 12 and cable seal 22, between cable seal 22 and top 30, and between top 30 and fixed plate 18, as will be described below. It is further preferable that inner gasket 46 be made of a material having a lower durometer or relative softness than outer gasket 48, even if both gaskets are made of the same general material.

Referring now to FIG. 4, outer gasket 48 includes a peripheral groove or slot 66 which is sized and configured to engage a peripheral edge 68 of cable entry point 14. A central opening 72 in outer gasket 48 is sized to receive inner gasket 46. An access slot or split 70 extends into central opening 72 and permits positioning of inner gasket 46 without having to pass either end of inner gasket 46 through opening 72. A plurality of openings 74 are spaced apart about central opening 72. A narrow web of gasket material 76 separates opening 72 from each of the openings 74.

Figure 5:
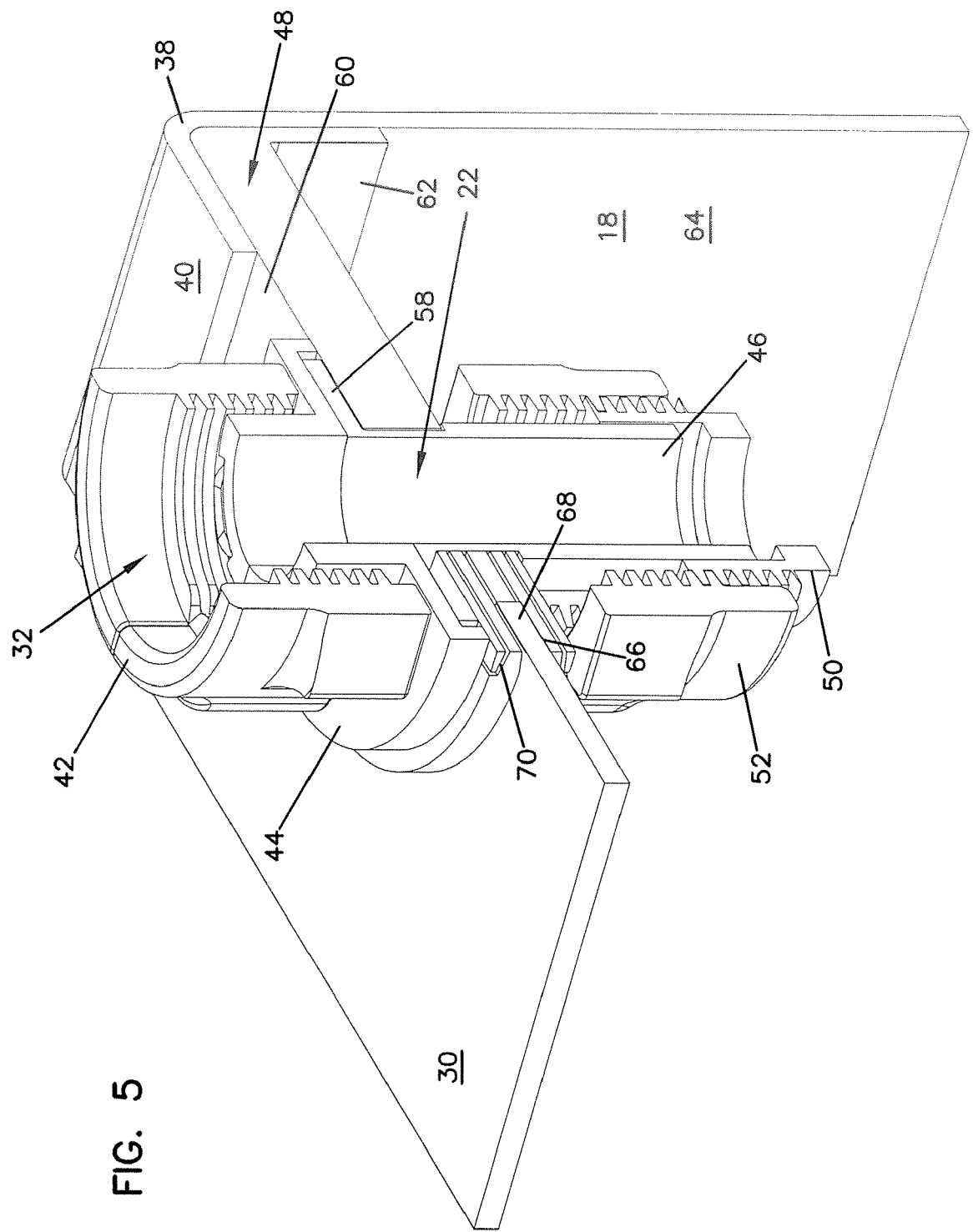
FIG. 5 is a perspective cross-sectional view of the cable entry seal of FIG. 3.
Figure 6:
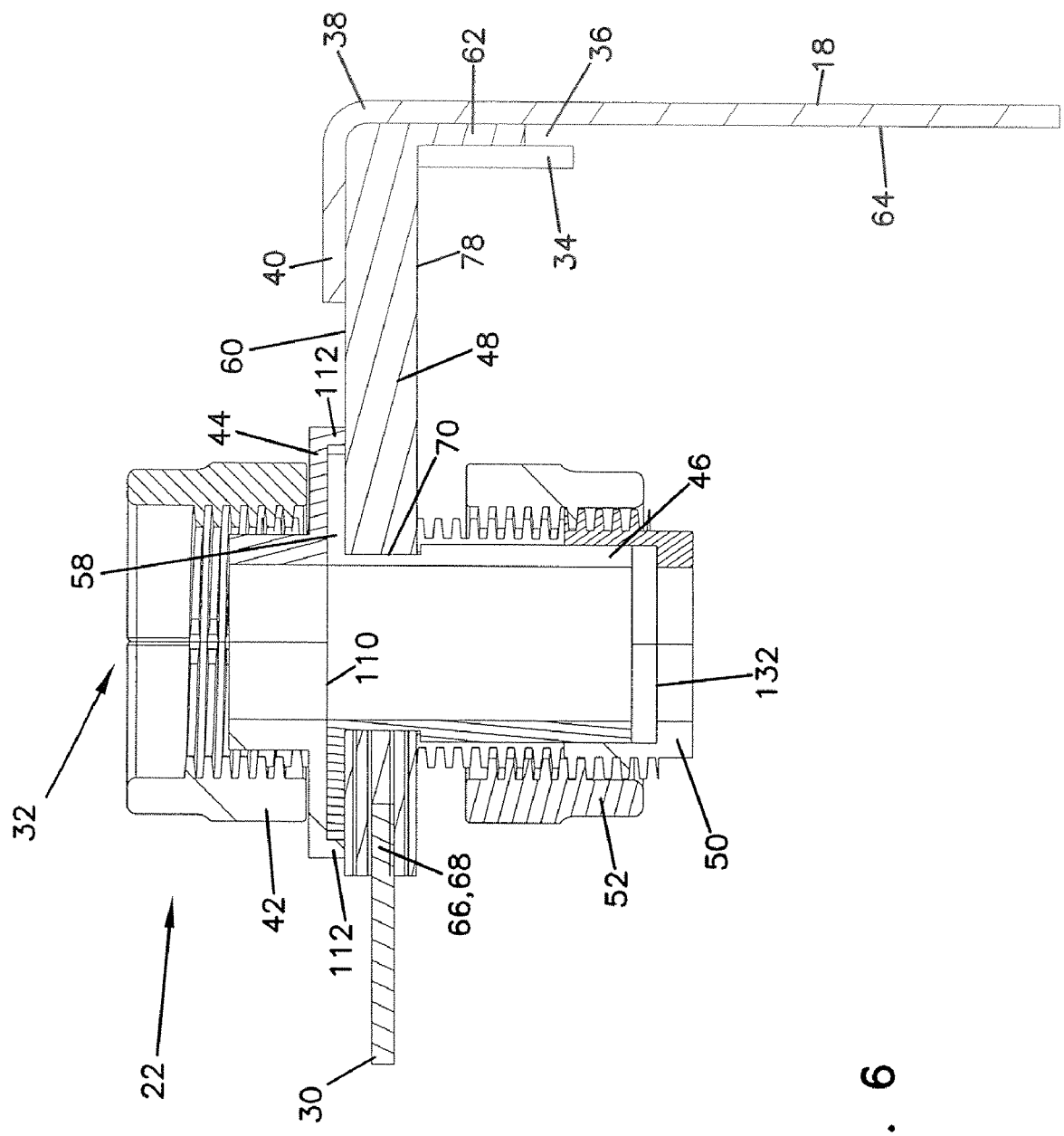
FIG. 6 is a side cross-sectional view of the cable entry seal of FIG. 3.

Referring now to FIGS. 5 and 6, cable seal 22 is shown in cross-sectional views to illustrate the relationship of the various elements comprising the cable seal. Gasket 46 is located entirely within threaded body 50, except for a flange 58 adjacent an outer end of cable 22. This flange 58 is positioned between an outer surface of outer gasket 48 and compression plate 44 and forms a weather-tight seal between gaskets 46 and 48 about central axial opening 32. Outer gasket 48 includes a transversely extending sealing flange 62 which may extend the length of top 30 and provides a seal between flange 34 of top 30 and an inner surface 64 of fixed plate 18. Sealing flange 62 extends within gap 36.

Inner and outer nuts 52 and 42 engage a threaded outer surface of threaded body 50. Advancing the nuts toward each other will compress inner and outer gaskets 46 and 48 and form the desired seals. Outer gasket 48 includes an outer surface 60 against which flange 58 of inner gasket 46 seals and an inner surface 78 which inner nut 52 may engage as it advances along threaded body 50. Each of outer nut 42, compression plate 44, threaded body 50, and inner nut 52 are composed of two halves which are separable from one another so that they can be fit about cable 12 anywhere along the length of cable 12, without passing over an end of cable 12. Gaskets 46 and 48 similarly include splits to permit passage of cable 12 so the gaskets can also be fit about cable 12 anywhere along its length.

Figure 8:
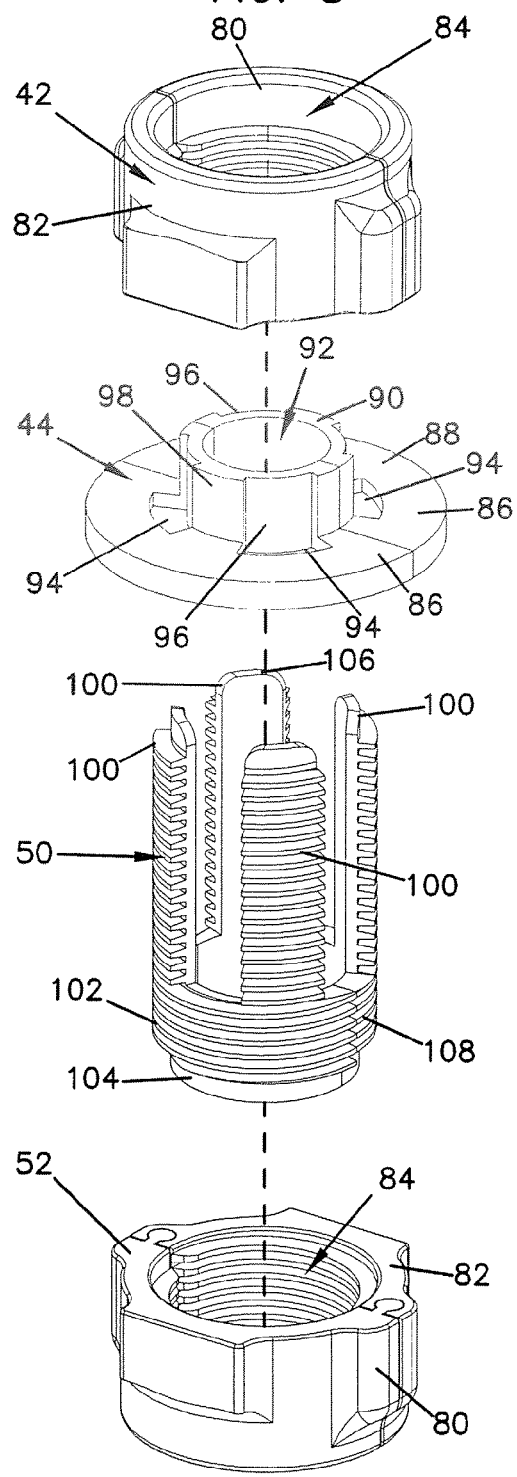
FIG. 8 is an exploded perspective view of the cable seal of FIG. 7.
Figure 7:
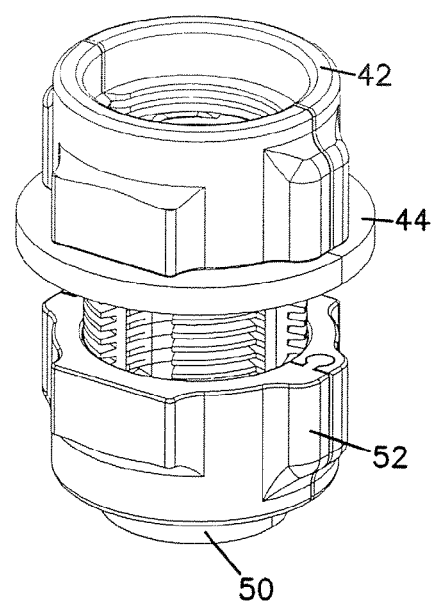
FIG. 7 is a perspective view of the cable seal of FIG. 3 removed from the enclosure and with the inner and outer gaskets removed.
Figure 13:
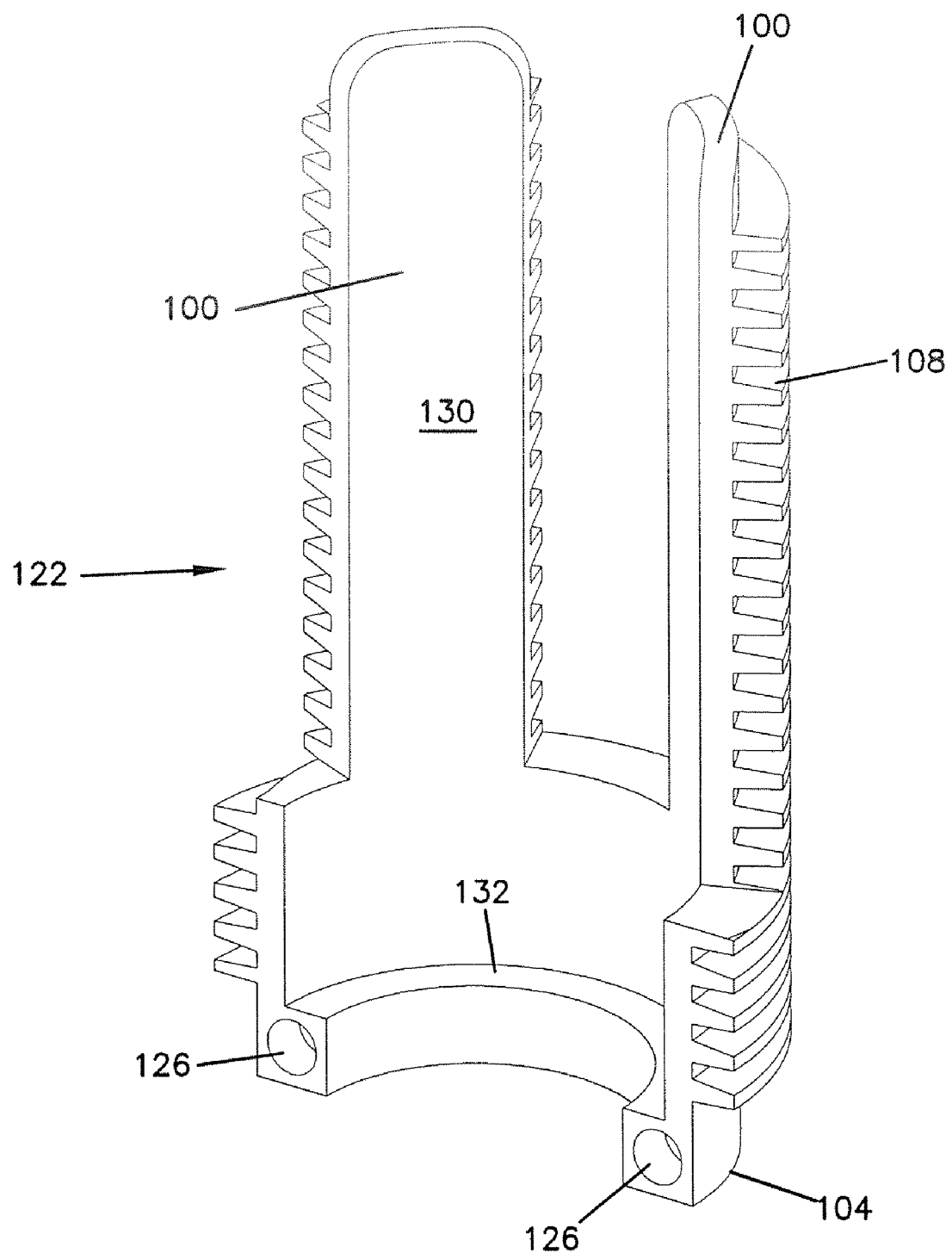
FIG. 13 is a perspective view of a first half of the threaded body of FIG. 11.
Figure 17:
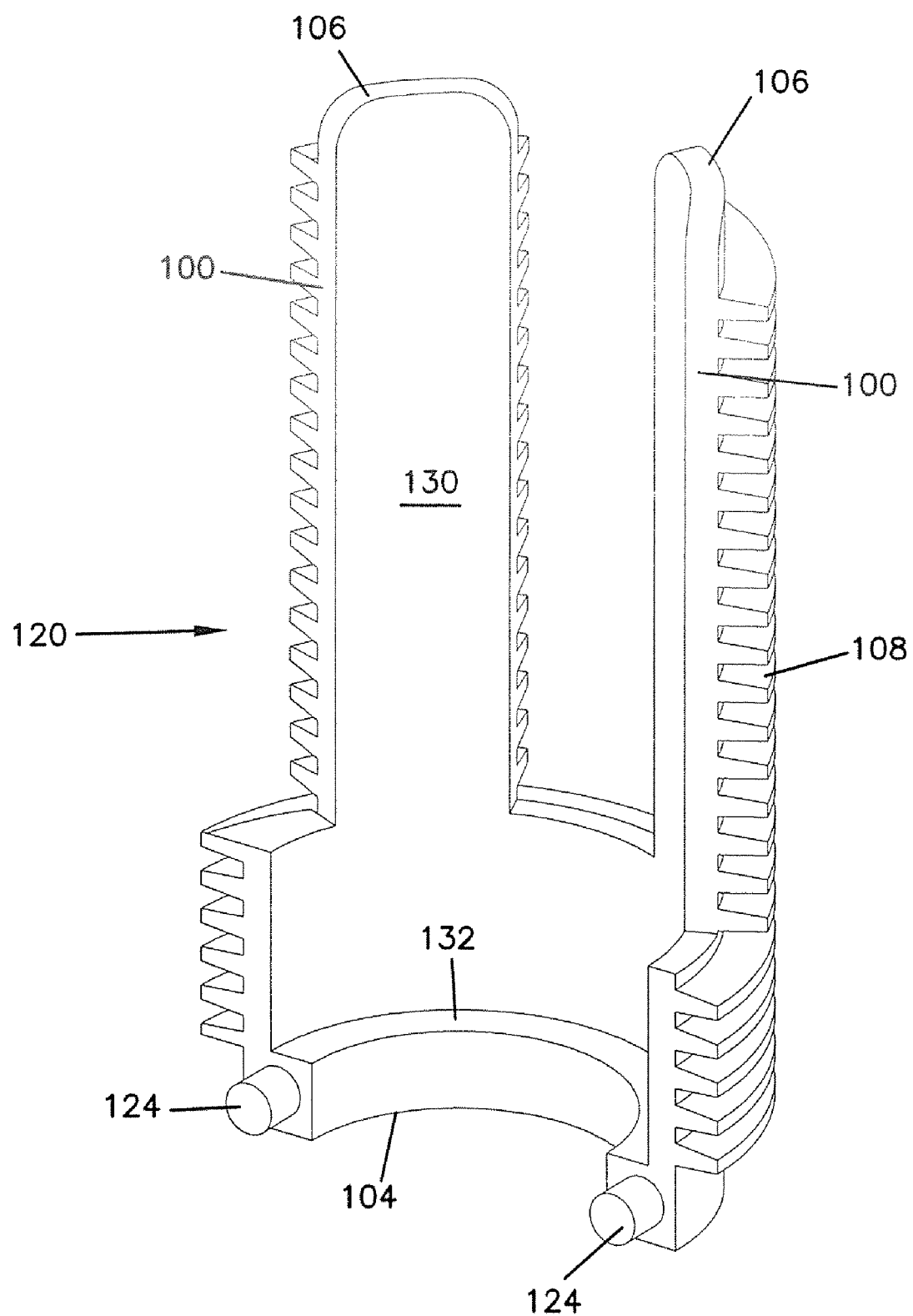
FIG. 17 is a perspective view of a second half of the threaded body of FIG. 11.
Figure 23:
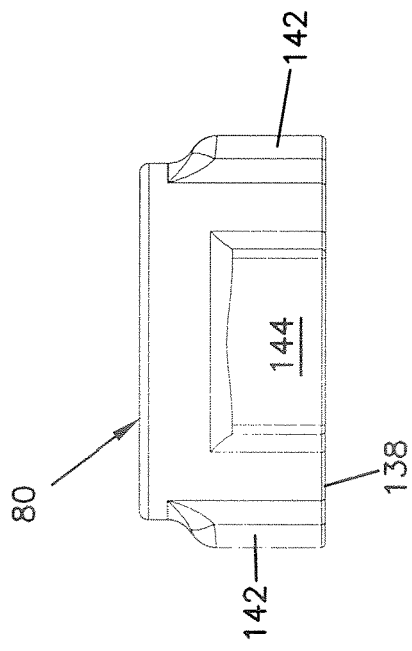
FIG. 23 is a perspective view of a first half of the split threaded nut of FIG. 21.
Figure 24:
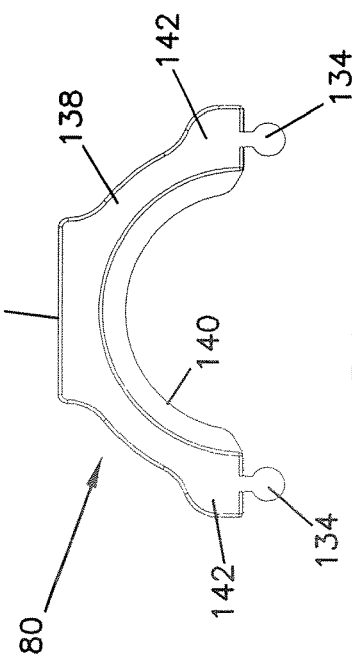
FIG. 24 is a side view of the first half of the split threaded nut of FIG. 23.
Figure 25:
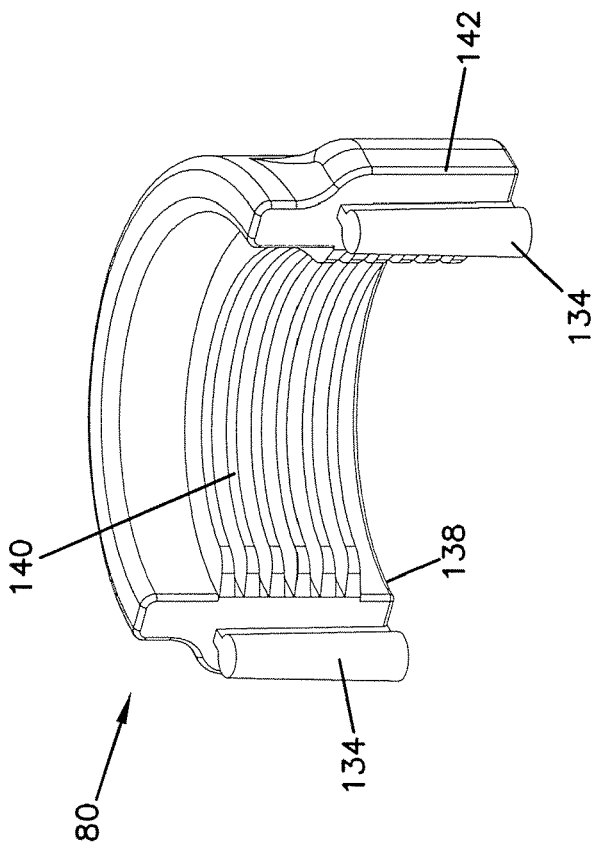
FIG. 25 is an end view of the first half of the split threaded nut of FIG. 23.
Figure 26:
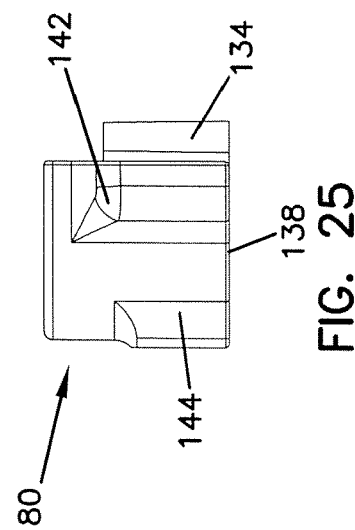
FIG. 26 is a top view of the first half of the split threaded nut of FIG. 23.

Referring now to FIGS. 7 and 8, cable seal 22 is shown with the inner and outer gasket removed. Outer nut 42 and inner nut 52, as shown are identical and each includes a pair of halves 80 and 82, which are shown in more detail in FIGS. 21 to 30, below. The halves 80 and 82 are unique and keyed to fit together so that continuous threads are defined within a central axial opening 84 of each nut. Compression plate 44 includes a pair of identical halves 86 which cooperate to define a plate 88, a center core 90 and a central axial opening 92. In plate 88 are a plurality of openings 94 spaced apart about core 90 and core 90 may include a matching number of recesses 96 in an outer surface 98 adjacent the openings 94. Openings 94 and recesses 96 are sized and positioned to receive a matching number of arms 100 of threaded body 50. Threaded body 50 includes arms 100 extending from a ring 102 at a first or inner end 104. Arms 100 cooperate to define a second or outer end 106. A continuous threaded outer surface 108 is defined by threaded body 50 so that either of the nuts 42 and 52 could be advanced continuously along a length of threaded body 50.

Referring now to FIGS. 9 and 10, Compression plate 44 and halves 86 include an inner compression surface 110 with a peripheral outer wall 112. Outer wall 112 extends from inner surface 110 and defines a compression limit wall 114. As shown in FIGS. 5 and 6, flange 58 of inner gasket 46 is engaged by surface 110 and compressed against outer surface 60 of outer gasket 48. The offset of limit wall 114 from compression surface 110 determines the limit to which flange 58 may be compressed. Potentially, if flange 58 is subjected to excessive compression, flange 58 may be damaged and the integrity of the seal between gaskets 46 and 48 may be adversely affected.

Recesses 96 in core 90 within which arms 100 extend provide support against inward deflection of arms 100 which might adversely affect the threaded engagement between arms 100 and outer nut 42. Between arms 100 are slots 116 which extend from outer end 106 toward inner end 104 and ring 102. With no inner gasket 44 in place, compression plate 44 may be able to slide along arms 100 the full length of slots 116. A contact surface 118 of outer wall 112 is defined which is preferably planar so that contact about surface 118 with outer surface 60 of outer gasket 46 is uniform and continuous about the entire diameter of compression plate 44. A space bounded by limit wall 114 and compression surface 110 is preferably sized to fit completely about flange 58 so that no portion of flange 58 extends between surface 118 and outer surface 60 of outer gasket 48.

FIGS. 11 and 12 illustrate that threaded body 50 includes a pair of halves 120 and 122 which cooperate to define a central axial opening 128. Arms 100 and ring 102 cooperate to define an inner surface 130 of threaded body 50. Inner surface 130 includes an inwardly extending compression ledge 132 adjacent inner end 104 within ring 102. To ensure that threaded outer surface 108 is continuous, halves 120 and 122 are not identical and are keyed to each other by mating of a pair of pins 124 of half 120 within recesses 126 of half 122, adjacent inner end 104.

FIGS. 13 to 16 provide a closer view of half 122 and FIGS. 17 to 20 provide a closer view of half 120.

Referring now to FIGS. 21 and 22, nuts 42 and 52 each include halves 80 and 82. Halves 80 and 82 are unique pieces to ensure that a continuous inner threaded surface 140 is formed within central axial opening 84 to engage outer threaded surface 108 of threaded body 50. Half 80 includes a pair of pins 134 and half 82 includes a pair of mating slots 136. The mating of pins 134 and slots 136 forms nuts 42 and 52 which are together radially so that they may be threadably mated with threaded body 50 and used to compress gaskets 44 and 46. A compression surface 138 is defined by each nut 42 and 52. As shown in FIG. 6, compression surface 138 of nut 42 will engage plate 88 of compression plate 44 as nut 42 is advanced along threads 108, and compression surface 138 of nut 52 will engage inner surface 78 of outer gasket 46 as nut 52 is advanced along threads 108.

FIGS. 23 to 26 provide a closer view of half 80. Adjacent pin 134 is a boss 142 that provides additional material to support pin 134 and the connection on pin 134 and slot 136. In addition, a raised portion 144 may also be provided on an exterior surface of half 80. Boss 142 and raised portion 144 may provide improved grip to a user tightening the nut to cable seal 22. FIGS. 26 to 30 similarly show a closer view of half 82, which may also include a boss 146 to provide support for slot 136 and raised portion 144.

Referring now to FIGS. 31 to 33, Inner gasket 46 includes a central core 148 extending from a first or inner end 150 to a second or outer end 152 where flange 58 is located. A central axial opening 154 extends from inner end 150 to outer end 152 and is sized to receive cable 12. A split 156 permits passage of cable 12 into opening 154 without passing an end of cable 12 through opening 154. This allows gasket 46 to be placed about an existing terminated cable without cutting or impacting any connections made with elements of cable 12.

A plurality of openings 158 extend through flange 58 about central axial opening 154. Openings 158 permit arms 100 of threaded body 50 to extend through inner gasket 46 and engage outer nut 42. Openings 158 are solely within flange 58 and that arms 100 will pass along an outer surface 160 of central core 148. When inserted within central opening 92 of threaded body 50, core 148 sits entirely within opening 92, with outer surface 160 adjacent inner surface 130. A recessed portion 162 of outer surface 160 is provided to positioning outer gasket 48 about inner gasket 46 during assembly of cable seal 22. When outer gasket 48 is positioned within recess 162, outer surface 60 of gasket 48 is positioned adjacent inner surface 168 of flange 58. An outer surface 166 and an edge 164 are also part of flange 58. Edge 164 is sized to not extend beyond peripheral wall 112 of compression plate 44 and outer surface 166 is engaged by compression surface 110.

When gasket 46 is positioned within cable seal 22, as shown in FIG. 4, and nut 42 is advanced along threaded body 50 to engage flange 58, compression surface 110 and ledge 132 are drawn together. The drawings together of these two surfaces compresses core 148 as well as flange 58. However, the compression of flange 58 is stopped when peripheral wall 112 engages outer surface 60 of outer gasket 48. Continued advancement of nut 42 along threaded body 50 draws ledge 132 closer to nut 42 and continues compression of core 148, causing core 148 to bulge. As core 148 is compressed, it cannot bulge outward due to the proximity of inner surface 130 of threaded body 50 to outer surface 160. Therefore, all bulging of core 148 is directed inward, into opening 154 where cable 12 passes. This internal bulging of core 148 seals against cable 12.

Referring now also to FIG. 6, once peripheral wall 112 has engaged outer surface 60 of outer gasket 48, advancement of nut 42 will compress peripheral groove 66 of gasket 48 against peripheral edge 68 of cable entry point 14. Alternatively, advancing nut 52 once surface 138 of nut 52 engages inner surface 78 of gasket 48 will also tend to compress groove 66 against peripheral edge 68. Either nuts compression of groove 66 against edge 68 will form a seal between cable seal 22 and cable entry point 14.

FIGS. 34 and 35 show enclosure 10 with removable shell 20 exploded from fixed plate 18. Cable seal 22 is mounted to fixed plate 18 and cable entry point 14 is part of shell 20. In this arrangement, it is anticipated that any telecommunications equipment within interior 28 will be mounted to inner surface 64 and that shell 20 can be removed without disturbing any of the equipment. Prior to removal of shell 20, nuts 42 and/or 52 of cable seal 22 will preferably be retracted from engagement of other parts of cable seal 22 to relieve compression of gasket 48 against cable entry point 14.

Sealing flange 62 of outer gasket 48 preferably extends across the full width of fixed plate 18 adjacent top end 38 to provide a consistent, unbroken seal within gap 36. It is desirable to not have any vertical discontinuity along this horizontal edge to reduce possible entry points for water and other contaminants. A separate seal 170 is formed around the remainder of the interface between fixed plate 18 and removable shell 20. Seal 170 is preferably a single gasket or a series of individual gasket elements.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention, Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:
1. A method for sealing a cable in an enclosure comprising:
assembling a cable seal around a cable, the cable seal defining a central axial opening having a sealing surface, the cable being disposed in the central axial opening, wherein the cable seal includes:
a threaded body having first and second halves that cooperate to form a generally cylindrical body with the central axial opening and a threaded outer surface;

an inner nut having a pair of halves releasably attached to each and threaded about an end of the threaded body; and an outer nut having a pair of halves releasably attached to each and threaded about the end of the threaded body;

inserting the cable seal and cable through an entrance of a generally u-shaped cable entry point of a side of an enclosure; and positioning the cable seal within the cable entry point such that the cable seal protrudes from opposite surfaces of the side, wherein an outer gasket seals between the surfaces of the side of the enclosure and the cable seal.

2. A method for sealing a cable in an enclosure as claimed in claim 1, wherein advancing the outer nut toward the inner nut reduces an inner diameter of the sealing surface.

3. A method for sealing a cable in an enclosure as claimed in claim 2, wherein the sealing surface is an inner gasket disposed in the central axial opening.

4. A method for sealing a cable in an enclosure comprising:
assembling a cable seal around a cable, the cable seal defining a central axial opening having a sealing surface, the cable being disposed in the central axial opening, wherein the cable seal includes:

a threaded body including first and second halves which cooperate to form a generally cylindrical body with the central axial opening and a threaded outer surface, the body having a first end and a second opposite end, the first end including a continuous circumferential ring and a plurality of arms extending from the ring to the second end, an outer surface of each arm threaded and defining a portion of a circle, the central axial opening including an internally extending ledge within the ring adjacent the first end;

a compression plate including a pair of halves which cooperate to form a generally flat plate having an outer surface and an inner surface and with a central axial opening defined by a central cylinder, the compression plate including a plurality of openings sized to receive the arms of the threaded body;

an inner gasket including a central axial opening, a generally cylindrical core extending from a first inner end to a second outer end and a radially extending flange at the second end, the flange including a plurality of openings sized to receive the arms of the threaded body via the openings of the compression plate, the second end of the inner gasket adapted for engaging the inner surface of the compression plate and the first end of the inner gasket adapted for engaging the ledge within the threaded body, wherein the inner gasket is split to provide access to the central axial opening through a side wall of the inner gasket;

the outer gasket including a plurality of openings positioned about a central opening sized to receive the arms of the threaded body, the outer gasket including an outer edge in which is formed a groove, the outer gasket including an inner face and outer face, and a slit from the outer edge into the central opening;

an outer nut including a pair of halves releasably attached to each and adapted for threaded engagement about the second end of the threaded body, the outer nut adapted for engaging the outer surface of the compression plate; and an inner nut including a pair of halves releasably attached to each and adapted for threaded engagement about the second end of the threaded body, the inner nut adapted for engaging the inner face of the outer gasket inserting the cable seal and cable through an entrance of a generally u-shaped cable entry point of a side of an enclosure; and positioning the cable seal within the cable entry point such that the cable seal protrudes from opposite surfaces of the side, wherein an outer gasket seals between the surfaces of the side of the enclosure and the cable seal.

5. A method for sealing a cable in an enclosure as claimed in claim 4, wherein the inner nut and outer nut are identical.

6. A method for sealing a cable in an enclosure as claimed in claim 4, wherein advancing the outer nut toward the inner nut compresses the core of the inner gasket between the compression plate and the ledge of the threaded body causing the central axial opening of the inner gasket to reduce in diameter.

* * * * *